Figure 3:
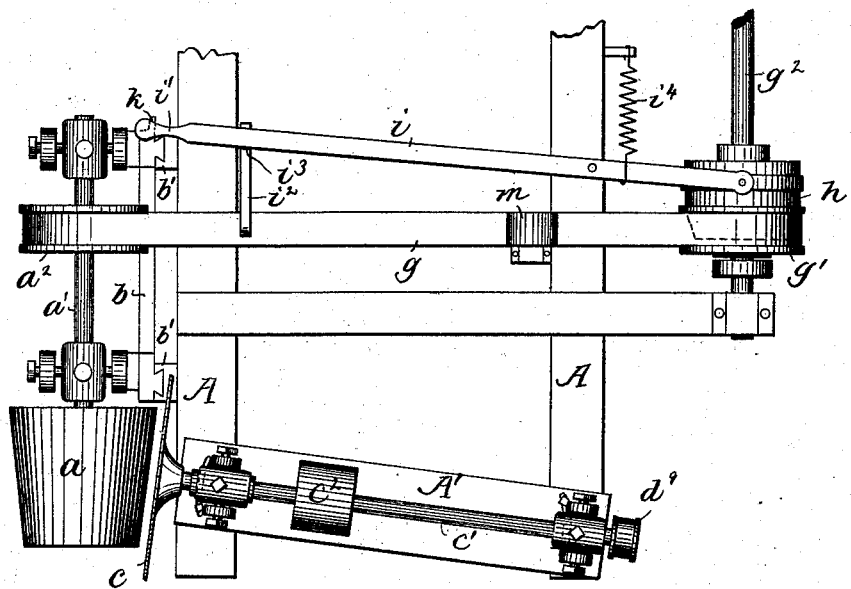

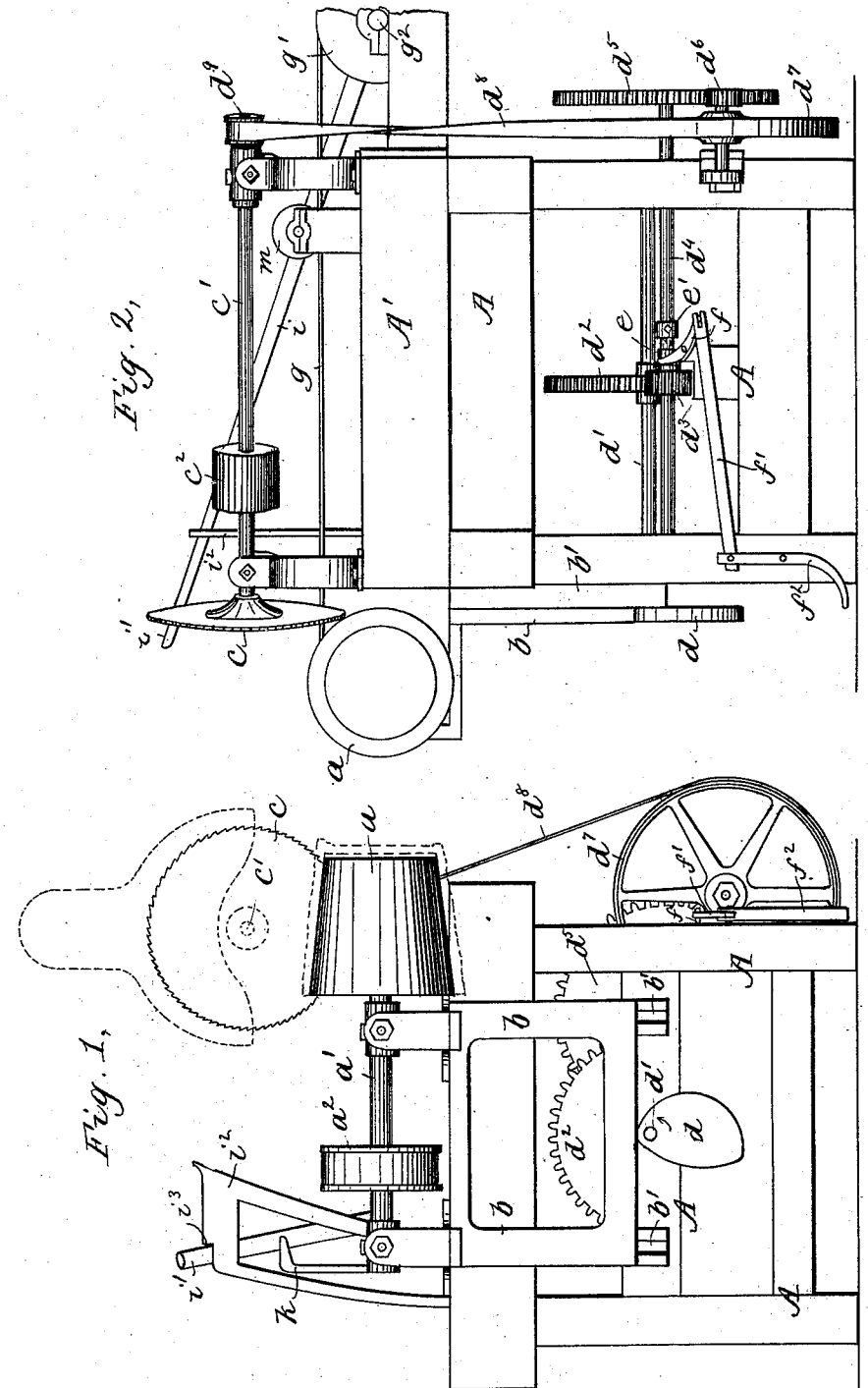

(No Model.) 2 Sheets—Sheet 2.

F. E. KEYES.
TURNING MACHINE.

No. 406,514. Patented July 9, 1889.

Witnesses,
Jas. J. Maloney
M. E. Hill

Inventor,
F. E. Keyes,
by Jos. P. Livermore
Atty.

UNITED STATES PATENT OFFICE.

FRANK EUGENE KEYES, OF PETERBOROUGH, NEW HAMPSHIRE, ASSIGNOR OF ONE-HALF TO THE AMOSKEAG INDURATED FIBRE WARE COMPANY, OF SAME PLACE.

TURNING-MACHINE.

SPECIFICATION forming part of Letters Patent No. 406,514, dated July 9, 1889.

Application filed August 20, 1888. Serial No. 283,169. (No model.)

*To all whom it may concern:*

Be it known that I, FRANK EUGENE KEYES, of Peterborough, county of Hillsborough, State of New Hampshire, have invented an Improvement in Turning-Machines, of which the following description, in connection with the accompanying drawings, is a specification, like letters on the drawings representing like parts.

My invention relates to a machine for turning objects or articles, and is shown embodied in a machine for turning or cutting to true external shape articles of cylindrical or frusto-conical shape—such, for example, as pails made from molded pulp.

In the manufacture of pulp articles—such as pails, firkins, tubs, or boxes—the pulp is first molded by powerful compression or otherwise to substantially the required shape; but as the outer or contractile molds usually employed are not rigid the articles are not absolutely uniform in size or shape at their external surface, and are commonly made considerably larger or with thicker walls than intended for the finished article, and, after the pulp has been dried so as to become hard and solid, portions at its outer surface are cut away to bring it to the required size and shape for the finished article. This cutting down of the outer surface has commonly been done in a machine having a mandrel or support for the article, which is rotated about its axis while being cut, as in the usual processes of turning, and its surface has usually been acted upon by gangs of saw-like cutters, the planes of which are at right angles to the part of the surface of the article on which they act, and either the article or the gang of cutters has a feed movement, one relative to the other parallel to the axis of the cutters, so that they act on the entire surface of the article during such feed movement. By this method the teeth of the cutters strike or gouge into the surface of the article being turned, and tend to tear off portions of the article, thus leaving the surface rough, and in many cases producing indentations of considerable depth, so that a large amount of the surface has to be sandpapered away in the subsequent finishing operation in order to get a uniform surface.

The object of this invention is to remove the objections to this mode of operation in turning articles of this kind, and the machine forming the subject of this invention works much more rapidly than machines heretofore employed for this class of work, and produces a true, uniform, and smooth surface on the article being turned.

The invention consists, mainly, in a machine comprising a mandrel or support for holding and rotating the article to be turned and a rotating cutter the plane of which is substantially tangential to the surface of the object to be turned.

The invention further consists in various accessory devices for feeding the object with relation to the cutter for facilitating the application of the articles to and their removal from the mandrel or support by which they are held and rotated while being cut. The feed movement is parallel with the plane of the cutter instead of at right angles thereto, as in machines heretofore used for this class of work. The cutter, while resembling a circular saw in general appearance, is of different construction from an ordinary saw, the side edges and not the ends of the teeth being the main effective cutting portions.

Figure 1 is an end elevation of a turning-machine embodying this invention; Fig. 2, a front elevation thereof; Fig. 3, a partial plan view showing the operative parts above the main frame, and Fig. 4 a detail illustrating the cutting portion of the rotating cutter.

The machine shown in this instance as embodying this invention is intended for turning the outer surfaces of buckets which are frusto-conical in shape; but it will be apparent that by merely modifying the shape and position of certain parts it may be employed to turn other articles—such as tubs or cylindrical boxes or the like.

The machine comprises a drum or mandrel *a*, shown in this instance as shaped to fit the interior of the molded buckets, which are substantially uniform in shape at the inside, as they are molded upon a rigid former, and the buckets are held securely by simply driving them upon the mandrel, as indicated in dotted lines, Fig. 1. The mandrel $a$ is mounted on a shaft $a'$, which may be rotated at high speed by a pulley $a^2$, and is, as shown in this instance, supported in bearings upon a carriage $b$, having a sliding movement in guides upon the main stationary frame-work A of the apparatus. The cutter $c$ is supported on a shaft or arbor $c'$, provided with a pulley $c^2$, Fig. 2, by which it may be rotated at high speed, and the bearings for said cutter shaft or arbor $c'$ are preferably on a supplemental frame A', rigidly fastened to the main frame A, but made separately, so that the position of the cutter-shaft with relation to the main frame may be adjusted according to the shape or size of the article to be turned.

As shown in this instance, the supplemental frame A' and cutter-arbor $c'$ are slightly inclined to the front of the main frame, the angle of inclination being the same as that of the side of the article to be turned, so that the cutter-shaft $c'$ is at right angles to the slant height of the mandrel $a$ and article supported thereon, and the cutter $c$ is itself set with its plane tangential to the side of the article to be turned, as will be readily understood from Fig. 2. The result of this arrangement is that the edges or teeth of the cutter act in a direction tangential to the surface being cut, and have a true cutting action without tendency to tear or chip off portions of the article being turned, which is thus finished with a true smooth surface.

The article is fed or presented gradually to the surface of the cutter by the movement of the carriage $b$, and, as shown in this instance, the machine comprises means for automatically feeding the carriage at the proper speed for the effective action of the cutter, and then rapidly retracting the same. This feed movement is produced by a cam $d$ on a shaft $d'$, provided with a gear $d^2$, meshing with a pinion $d^3$, (see Fig. 2,) loose on a shaft $d^4$, provided with a gear $d^5$, meshing with a pinion $d^6$, (see Fig. 2,) connected with a pulley $d^7$, driven by a belt $d^8$ from a pulley $d^9$ on the cutter-shaft $c'$. The pinion $d^3$, as before stated, is loose on the shaft $d^4$, and is provided with one member $e$ of a clutch, the other member $e'$ of which is fast on the said shaft $d^4$, the said member $e$ being moved longitudinally into and out from engagement with the member $e'$ by a shipper-lever $f$, which may be operated at the will of the workmen, being shown as connected by a link $f'$ with a foot lever or treadle $f^2$ in a position easily accessible to the operator manipulating the articles to be turned. The clutch members $e$ and $e'$ are provided with engaging projections, as clearly shown in Fig. 2, which are steep on the sides that engage when the member $e'$ is driving the member $e$, and when the clutch is thus connected the train of mechanism between the cam-shaft $d'$ and the cutter-shaft $c'$, forms a speed-reducing train, so that the cam-shaft turns once to a very large number of rotations of the cutter-shaft, thus turning the cam in the direction of the arrow, Fig. 1, and slowly raising the carriage $b$, and thus feeding the rapidly-rotating object on the mandrel $a$ to the cutter $c$. After the highest point of the cam $d$ has come beneath the carriage and the cam rotates somewhat farther, the weight of the carriage tends to continue the rotation of the cam in the same direction, and thus tends to turn the gear $d'$ and pinion $d^3$ in the same direction that they are already moving, but with greater speed, so that the pinion $d^3$ and clutch member $e$ run away, as it were, from the clutch member $e'$, and the rear sides of the engaging projections of the clutch members are brought together, and being inclined, as shown in Fig. 2, cause the member $e$ to be thrown out of engagement with the member $e'$, so that the carriage $b$ drops rapidly, turning the cam $d$ half around to the position shown in Fig. 1, and at the same time disengaging the clutch $e\ e'$, so that the cam will not again be actuated until the clutch has again been engaged by the operator. The mandrel $a$ thus remains in its lowest position sufficiently far from the edge of the cutter to enable the article which has just been turned to be removed and another one substituted, after which the operator merely engages the clutch $e\ e'$ again by operating the foot-lever $f^2$, and the machine runs automatically until the article placed on the mandrel has been turned to shape and the mandrel again lowered, as before.

It is desirable to stop or check the rotation of the mandrel while the articles are being applied to and removed therefrom, and means are provided for accomplishing this as follows: The pulley $a^2$ on the mandrel-shaft $a'$ is driven by a belt $g$ from a pulley $g'$ on an actuator-shaft $g^2$, the said pulley being loose on said shaft and connected with or forming one member of the clutch $h$. (See Fig. 3, which shows the parts in plan view.) The said clutch $h$ is operated by a shipper-lever $i$, extending across the machine and provided with a handle $i'$, in position to be easily moved by the operator. The said handle $i'$ in its movement to engage and disengage the clutch travels upon a support $i^2$, having a shoulder $i^3$, that holds the lever in position with the clutch engaged, the said lever tending to move in a direction to disengage the clutch under the action of a spring or equivalent. (Shown at $i^4$.)

The carriage $b$ is provided with a tripping device $k$, which, just before the carriage finishes its feeding movement, engages the handle $i$, lifts it from the shoulder $i^3$, and thus permits the clutch $h$ to be disengaged, so that the shaft $a'$ and mandrel $a$ are no longer positively driven. The turned article may then be taken off from the mandrel $a$ and another one substituted, after which the operator moves the shipper-handle $i'$ to engage the clutch $h$, by which the shaft $a'$ is caused to rotate, and also engages the clutch $e\ e'$, which causes the feed to take place, and the machine will then continue to operate without further attention until the article has been turned to the desired shape and the mandrel been returned to its original position, as before stated.

An idler $m$ acts on the belt $g$, tending to make it tighter as the article is fed toward the cutter, so that the latter acts on greater portions of its surface and the direction of the rotation of the cutter is such as to tend to force the article farther onto the mandrel.

Figure 4:
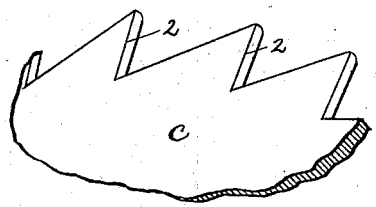

The character of the teeth of the cutter is indicated in Fig. 4, and it is the edges 2 in the plane or face of the cutter that do the main portion of the cutting work, although the ends of the teeth act on the material to a certain extent.

In order to prevent the chips of material from being scattered about, the cutter may be inclosed in a box, as indicated in dotted lines at $n$, (see Fig. 1,) communicating with a pipe $n'$, from which the air is exhausted, so that the chips are drawn through the said pipe, and may be discharged into the pulping-engine, to be again converted into pulp.

I claim—

1. The combination of a cutting-disk having peripheral teeth, the cutting-edges of which are in the plane of one face of the cutter and at the ends of the said teeth, with a mandrel that supports and rotates the article to be turned, and feed-carriage for said mandrel having guides at right angles to the axis of said mandrel, whereby the article is presented laterally to the cutting-disk, which is tangential to the surface of the article supported on the mandrel, substantially as described.

2. The mandrel and its supporting and feeding carriage, combined with the cutter and train of wheel-work actuated by the cutter-shaft, one of the shafts of which train is provided with a cam which actuates the carriage, and a clutch by which portions of said train of wheel-work are connected to cause the feed movement of the carriage, said clutch being constructed, as described, to be disengaged by the return movement of the carriage, substantially as described.

3. The combination of the cutter with the mandrel for supporting and rotating the article to be turned, and a feed-carriage for said mandrel, with an actuating-shaft for said mandrel and clutch thereon, and clutch-shipper operated by said carriage, substantially as described.

In testimony whereof I have signed my name to this specification in the presence of two subscribing witnesses.

FRANK EUGENE KEYES.

Witnesses:
  M. L. MORRISON,
  NELLIE F. CUMMINGS.